US011371737B2

(12) United States Patent
Katyal et al.

(10) Patent No.: US 11,371,737 B2
(45) Date of Patent: Jun. 28, 2022

(54) OPTIMIZATION ENGINE FOR ENERGY SUSTAINABILITY

(71) Applicant: Target Brands, Inc., Minneapolis, MN (US)

(72) Inventors: Nikita Katyal, Karnataka (IN); Bharath Rangarajan, Minneapolis, MN (US); Sourav Das, San Francisco, CA (US); Jay Gaynor, Pittsburgh, PA (US); Matthew Johnson, Minneapolis, MN (US)

(73) Assignee: Target Brands, Inc., Minneapolis, MN (US)

( * ) Notice: Subject to any disclaimer, the term of this patent is extended or adjusted under 35 U.S.C. 154(b) by 272 days.

(21) Appl. No.: 16/505,315

(22) Filed: Jul. 8, 2019

(65) Prior Publication Data

US 2021/0010709 A1   Jan. 14, 2021

(51) Int. Cl.
*F24F 11/47* (2018.01)
*G05B 19/042* (2006.01)
(Continued)

(52) U.S. Cl.
CPC .............. *F24F 11/47* (2018.01); *F24F 11/64* (2018.01); *F24F 11/65* (2018.01); *G05B 19/042* (2013.01);
(Continued)

(58) Field of Classification Search
None
See application file for complete search history.

(56) References Cited

U.S. PATENT DOCUMENTS

| 8,384,357 | B2 | 2/2013 | Park | |
|---|---|---|---|---|
| 2005/0005621 | A1* | 1/2005 | Jayadev | ............. G05D 23/1923 62/230 |

(Continued)

FOREIGN PATENT DOCUMENTS

KR    10-2010-0130667 A    12/2010

OTHER PUBLICATIONS

International Search Report and Written Opinion for Application No. PCT/US2020/041225 dated Oct. 22, 2020.
(Continued)

*Primary Examiner* — Paul B Yanchus, III
(74) *Attorney, Agent, or Firm* — Merchant & Gould P.C.

(57) ABSTRACT

A method for reducing peak electrical demand of a building includes generating a baseline electrical demand profile over a target time period from a model. The baseline electrical demand profile can be used to define a policy including a peak management period having at least a first sub-period and a subsequent second sub-period, the first sub-period having a first temperature set point for at least one air handling system of the building that is different from a normal operating temperature set point, the second sub-period having a second temperature set point different from both the normal operating temperature set point and the first temperature set point, and implementing the policy. The model can be generated from one or more of historical electrical data for the building, weather forecast data, building and equipment operating schedules, sales data, and data based on information received from a video camera located in the building.

15 Claims, 6 Drawing Sheets

(51) Int. Cl.
*F24F 11/64* (2018.01)
*F24F 11/65* (2018.01)
*F24F 140/60* (2018.01)
*F24F 140/50* (2018.01)

(52) U.S. Cl.
CPC ....... *F24F 2140/50* (2018.01); *F24F 2140/60* (2018.01); *G05B 2219/2639* (2013.01)

(56) References Cited

U.S. PATENT DOCUMENTS

| | | |
|---|---|---|
| 2007/0120535 A1 | 5/2007 | Wallace |
| 2008/0177423 A1 | 7/2008 | Brickfield et al. |
| 2009/0157529 A1 | 6/2009 | Ehlers et al. |
| 2012/0022700 A1* | 1/2012 | Drees .................. G06Q 30/0283 700/276 |
| 2013/0138256 A1 | 5/2013 | Sako et al. |
| 2016/0313751 A1 | 10/2016 | Risbeck et al. |
| 2017/0198932 A1* | 7/2017 | Sato .................... H02J 13/0062 |
| 2018/0004171 A1 | 1/2018 | Patel et al. |
| 2018/0113482 A1 | 4/2018 | Vitullo |
| 2018/0252428 A1* | 9/2018 | Malcolm .................. F24F 11/59 |
| 2018/0306459 A1 | 10/2018 | Turney |
| 2018/0313563 A1 | 11/2018 | Turney et al. |
| 2018/0314220 A1 | 11/2018 | Kumar et al. |
| 2018/0340704 A1 | 11/2018 | Turney et al. |

OTHER PUBLICATIONS

Keeney, Kevin R., Braun, Ph.D., James E.; Application of Building Precooling to Reduce Peak Cooling Requirements (Application filed/Not Available to the Public), Available Prior to Jul. 8, 2019; 17 Pages.

Gorrie, Jeff; Peak Demand Reduction Strategies for Buildings, https://www.energymanagertoday.com; Dated: Dec. 28, 2018, 20 Pages.

Xu, et al., Peak Demand Reduction From Pre-Cooling With Zone Temperature Reset in an Office Building, Ernest Orlando Lawrence Berkeley National Laboratory, Presented at the 2004 ACEEE Summer Study on Energy Efficiency in Buildings, Pacific Grove, CA, Aug. 23-27, 2004; 13 Pages.

* cited by examiner

OPTIMIZATION ENGINE FOR ENERGY SUSTAINABILITY

TECHNICAL FIELD

The present disclosure relates generally to methods and systems for reducing the peak electrical demand load of a building. More particularly, the present disclosure describes a method by which the operation of selected air conditioning systems can be modeled and subsequently controlled to limit peak electrical consumption.

BACKGROUND

Electrical utilities provide power to a wide variety of end users, and have various pricing structures for different types of end users. Commercial and institutional facilities are commonly billed by the electrical utility for both the total usage of electricity over a billing period and are additionally charged a rate based on the maximum peak electrical demand used by the facility during the billing period. The former charge is generally referred to as a usage charge and is typically calculated by multiplying a usage rate by the total number of kilowatt-hours (kWh) consumed within the billing period. The latter charge is generally referred to as a peak demand charge and is typically calculated by multiplying a peak demand rate by the peak electrical demand kilowatts. While pricing structures of this type vary, the peak demand charges in some applications can be half or more of the electrical power bill. As electrical power bills represent a large expense for end users, strategies for reducing such expenses are desirable.

SUMMARY

In summary, the present disclosure relates to methods and systems for reducing peak electrical demand costs for a building, such as a retail store. The disclosure presents an approach the enables a building owner or operator to reduce the building peak electrical demand on a given day without requiring direct control over compressors or other equipment associated with the HVAC system. Safe and effective operation of such equipment can require a great deal expertise that is typically not within the skill set of building owners and operators. With the disclosed method, a policy can be generated from a model and pushed out to the building automation system and/or individual air handling units that temporarily changes the set points associated with the HVAC system to indirectly control the operation of the compressors. In this way, any building owner or operator can realize utility savings without necessitating the further implementation of highly complex controls. In one example, the policy can be structured to initially lower the set points of the selected equipment during a precooling period such that the building zone temperatures are initially reduced, return the set points to their normal settings during a drift period to allow the building zone temperatures to come back to their normal temperatures, and then raise the set points to above their normal settings during a curtailment period to allow the building zone temperatures to increase and thus lower the demand load on the cooling equipment. Accordingly, in some implementations peak electrical demand can be managed by only changing temperature set points of selected equipment over selected time periods without requiring detailed control over other operational parameters.

In one implementation, a method for reducing peak electrical demand of a building is disclosed including the steps of generating a baseline electrical demand profile over a target time period from a model, identifying a maximum peak demand value from the baseline electrical demand profile, calculating first and second reference peak value from the maximum peak demand value, defining a policy including a peak management period based on the first and second reference peak values, the peak management period including at least a first sub-period and a subsequent second sub-period, the first sub-period having a first temperature set point for at least one air handling system of the building that is different from a normal operating temperature set point, the second sub-period having a second temperature set point different from both the normal operating temperature set point and the first temperature set point, and implementing the policy.

In some examples, the first sub-period is a pre-cooling period and the first temperature set point is below the normal operating temperature set point.

In some examples, the second sub-period is a curtailment period and the second temperature set point is above the normal operating temperature set point.

In some examples, the peak management period includes a third sub-period sequentially between the first and second sub-periods.

In some examples, the third sub-period is a drift period having a third set point equaling then normal operating temperature set point.

In some examples, the target time period is a 24 hour period.

In some examples, the method further includes the step of verifying that the maximum peak demand value is greater than a peak demand-to-date value within a demand billing cycle.

In some examples, the method further includes the step of collecting performance data relating to implementing the policy.

In some examples, the first reference peak value is a predetermined value.

In some examples, the first reference peak value is between about 75 percent and about 95 percent of the maximum peak demand value.

In some examples, the first reference peak value is about 90 percent of the maximum peak demand value.

In some examples, the second reference peak value is a predetermined value.

In some examples, one or both of a starting time and an ending time of the pre-cooling period is a function of a first intersection between the baseline electrical demand profile and the second reference peak value.

In some examples, the pre-cooling period ends at the first intersection between the baseline electrical demand profile and the second reference peak value.

In some examples, the starting time of the curtailment period coincides with a time at which the maximum peak demand value occurs.

In some examples, the ending time of the curtailment period is a function of a second intersection between the baseline electrical demand profile and the second reference peak value.

In some examples, the curtailment period ends at the second intersection between the baseline electrical demand profile and the second reference peak value.

A method for reducing peak electrical demand of a building is disclosed. The method can include generating a baseline electrical demand profile over a target time period from a model, defining a policy including a peak management period based on the baseline electrical demand profile, the peak management period including at least a first sub-period and a subsequent second sub-period, the first sub-period having a first temperature set point for at least one air handling system of the building that is different from a normal operating temperature set point, the second sub-period having a second temperature set point for the at least one air handling system different from both the normal operating temperature set point and the first temperature set point, and implementing the policy.

In some examples, the model is generated from one or more of historical electrical data for the building, weather forecast data, building operating schedules, equipment operating schedules, sales data, and data based on information received from a video camera located in the building.

In some examples, the method further includes collecting performance data during implementation of the policy and optimizing the model for subsequent generations of the baseline electrical demand profile.

In some examples, the model is generated from one or more of historical electrical data for the building, weather forecast data, building operating schedules, equipment operating schedules, sales data, and data based on information received from a video camera located in the building.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

DETAILED DESCRIPTION

Figure 1:
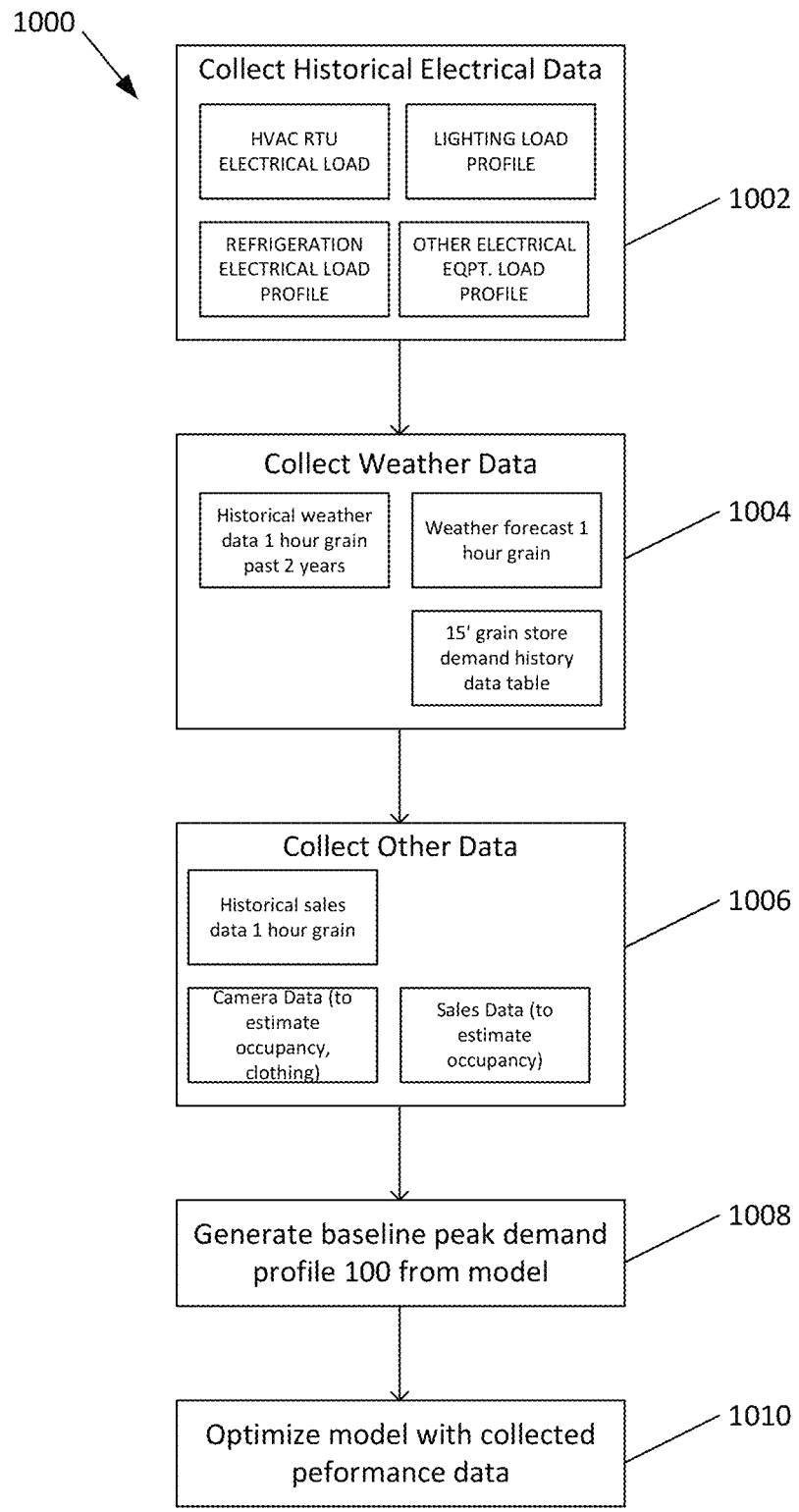
FIG. 1 illustrates a schematic diagram of an example modeling approach to develop a baseline electrical demand profile on a specified day for a building.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

Model and Trained Model Process 1000

With reference to FIG. 1, a process 1000 is shown for creating a model and a trained model from which a baseline electrical demand profile 100 for an upcoming target day can be generated. Although other time periods can be used, a target day including a 24 hour period is described herein as most utility billing structures are based on the peak electrical demand occurring on a single day. A graphical depiction of an example baseline demand profile 100 is presented at FIG. 4. The baseline demand profile 100 is the time-based predicted electrical demand load profile for the building that would be expected to occur throughout the day without altering temperature set points associated with the cooling equipment of the HVAC system. For example, the profile 100 can include a discrete electrical demand value for any desired time increment (e.g. every 1 second, every 1 minute, every 5 minutes, every 15 minutes, every 30 minutes, every 1 hour, etc.). From the baseline demand profile 100, the maximum or peak electrical demand value $P_{max\text{-}baseline}$ for the target day can also be identified as being the overall maximum electrical demand value.

In one aspect, the modelling process 1000 can be based on numerous variables and input data. For example, the model can include historical time series of energy consumption data 1102 in hourly frequency containing peak electrical demand and time of occurrence, the electrical demand one hour, two hours, and twenty four hours before the occurrence of the peak electrical demand, electrical demand associated with the HVAC system, electrical demand associated with refrigeration systems (e.g. freezers, coolers, etc.), electrical demand associated with lighting, and electrical demand associated with other building loads. This data can be further parsed and utilized to align with the parameters of the target day. For example, if the target day is a holiday, weekday, or a weekend day, the historical data set can be limited to include only the same type of days as the target day. Likewise, if the target day occurs within a given month, the historical data can be limited to days from that month and/or adjacent months.

The model can also be provided with historical and forward-looking or forecast data 1004 for the target day, such as outdoor dry bulb and wet bulb temperature, outdoor air dew point temperature, and outdoor air relative humidity over time. In one example, the historical electrical demand data set can also be limited to days that had generally similar weather as the forecast data indicates for the target day.

The model can also be provided with other types of data 1006. For example, the model can be provided with historical, real-time, or predicted sales-related data. Such data can be used to estimate building occupancy or traffic for the purpose of determining the associated internal heat gain of the building which can further enhance the performance of the model. For example, historical sales data on a similar day for which the baseline profile 100 is being created can be used to provide an enhanced estimation for hour-by-hour or even minute-by-minute occupancy. Real-time sales data could also be used as a proxy for building occupancy such that an updated or revised policy (discussed below) can be generated to account for any observed differences between the estimated occupancy load form historical or otherwise predicted data and the actual measured occupancy, as correlated through real-time sales data. The model can also be provided with historical or real-time video camera-related data. Such data can also be used to estimate building occupancy in the same manner as described above. Video camera-related data can also be used to assess the level of dress of the occupants, such that the temperature set points implemented during the peak management period (described below) can be optimized. For example, if occupants are relatively heavily dressed (e.g. wearing long sleeved clothing, jackets, or coats), the temperature set points may be lowered without compromising occupant comfort.

In one example, the model calculates 24 hours (i.e. the target day) of energy consumption using selected historical data (e.g. data from the past six months) and the forecast weather data at a step 1008. The model can utilize the elastic net method which is a linear regression model with both L1 and L2 regularization techniques relating to the lasso and ridge methods. In one aspect, the model balances the ratio (l1_ratio) of these regularizations and how much to penalize (alpha) depending on the error of prediction. The model performs random sampling of these hyperparameters from two specific distributions. In case of l1_ratio it is a uniform distribution from 0.01 to 0 and in case of alpha it is a uniform distribution from 0.001 to 0.1. From these hyperparameters the model generates the best fit curve using cross validation. Constraints are also put on the model to consider only positive parameters. This modelling approach has been used to generate baseline demand profiles 100 for five existing retail stores and compared to the actual measured peak demand power profiles for the buildings. The results of testing show that the generated baseline demand profiles 100 are 3.34% MAPE (mean absolute percentage error) of the actual measured peak demand power profiles. Accordingly, the disclosed modelling approach yields a baseline demand profile 100 that can be used to reasonably predict the energy demand profile for an upcoming target day for a building.

In one aspect, performance data relating to energy consumption during the target day can be recorded and then later utilized to train the model at step 1010 to iteratively improve the generation of the baseline demand profile 100.

Policy Generation 1100

Figure 2:
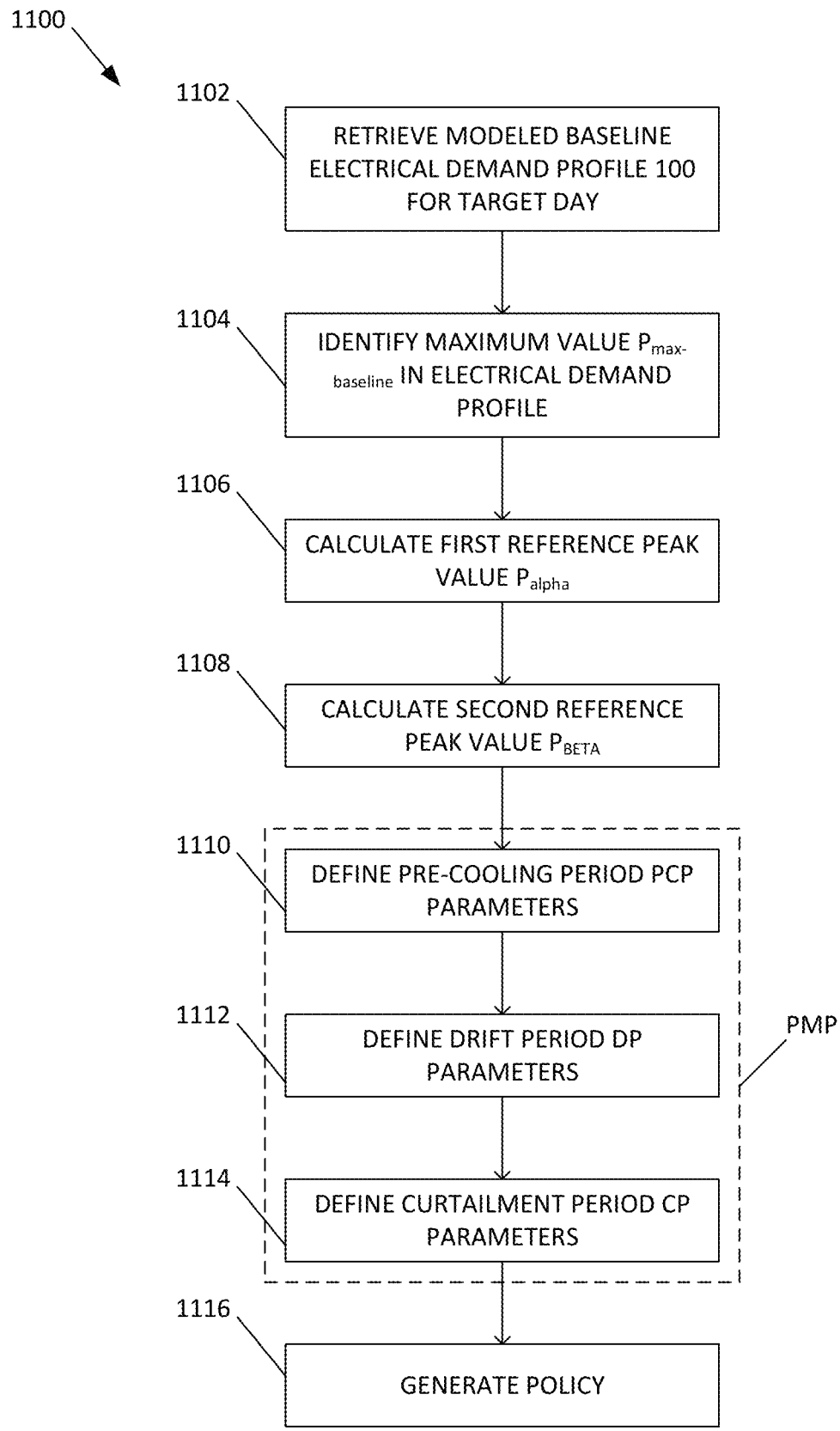
FIG. 2 illustrates a schematic diagram of an example process for generating a policy based on the model referenced in FIG. 1.

In one aspect, the policy can be generated by process 1100, shown at FIG. 2. In one aspect, the policy includes a set of instructions to temporarily alter the set points of selected cooling equipment of the HVAC system over different periods of time. The policy is implemented with the purpose of effectuating an actual electrical demand profile 110 having a reduced overall peak demand for the building, in comparison to the baseline electrical demand profile 100, on the day during which the policy is implemented, thus resulting in electrical demand savings. The actual demand profile 110 is the resulting demand profile that actually occurs after implementation of the policy.

As is discussed in more detail later, the policy can initially lower the set points of the selected equipment during a precooling period such that the building zone temperatures are initially reduced, return the set points to their normal settings during a drift period to allow the building zone temperatures to come back to their normal temperatures, and then raise the set points to above their normal settings during a curtailment period to allow the building zone temperatures to increase and thus lower the demand load on the cooling equipment. With such an approach, an electrical peak demand strategy can be implemented without requiring a building owner to directly control the individual HVAC system components (i.e. compressors) and also without requiring complex building energy modelling of the facility. The objective of the policy is to achieve an actual demand electrical profile 110 having a reduced overall peak demand in comparison to the predicted overall peak demand associated with the baseline demand profile.

Figure 3:
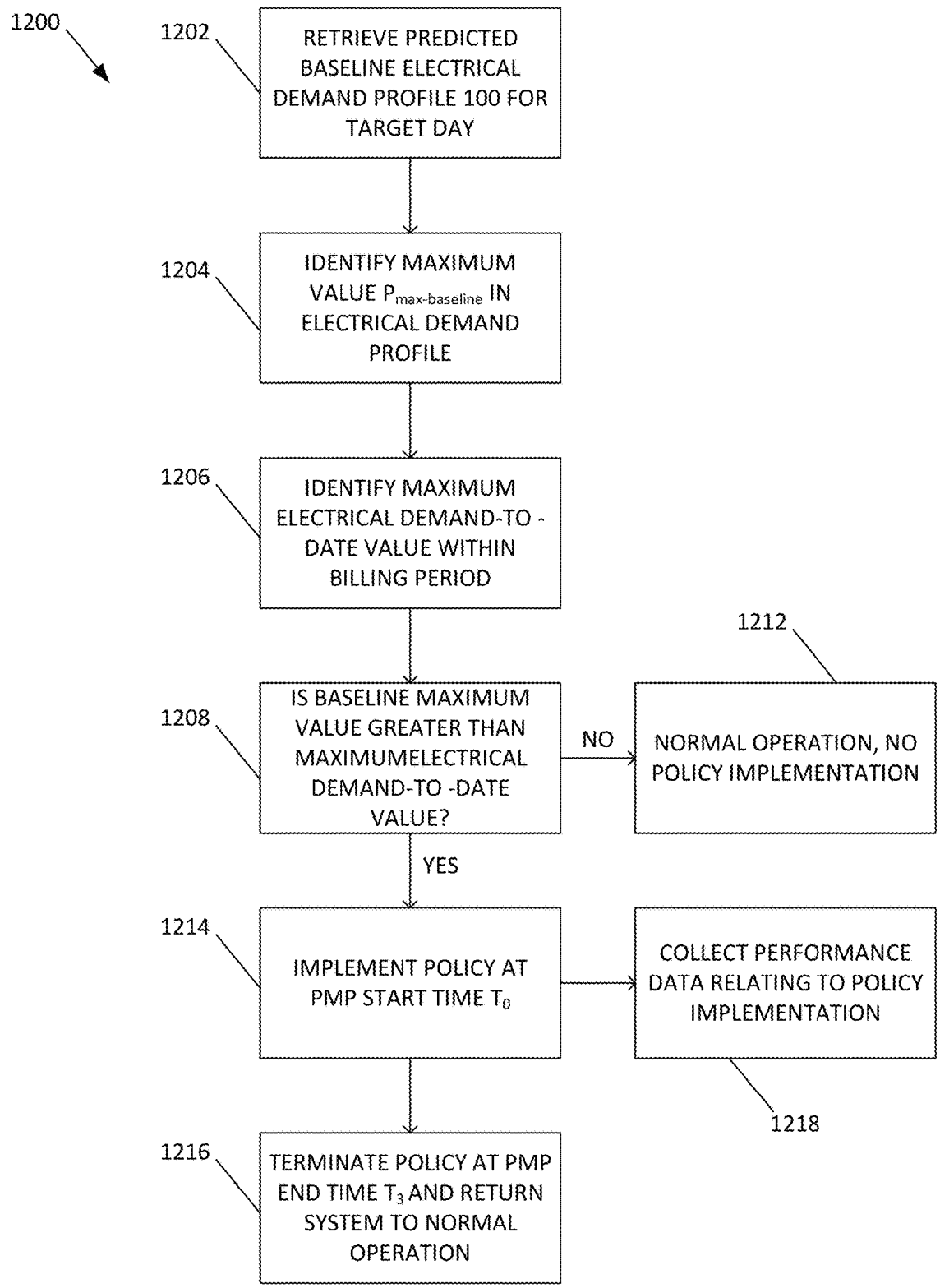
FIG. 3 illustrates a schematic diagram of an example process for implementing the policy referenced at FIG. 2.

Referring to FIG. 3, the policy generation process 1100 can include retrieving the baseline electrical profile 100 at step 1102 and identifying the peak value $P_{max\text{-}baseline}$ of the baseline demand profile 100 at step 1104. The baseline electrical demand profile 100, the actual electrical demand profile 110, and the following described parameters are graphically depicted at FIG. 4. At a step 1106, a first reference peak value $P_{alpha}$ is identified which is defined by the peak value $P_{max\text{-}baseline}$ minus a first increment $x_1$. In generalized terms, the first reference peak value $P_{alpha}$ represents the desired maximum peak power that the building will actually reach during implementation of the policy. As such, if the policy is successful, the actual maximum peak power $P_{max\text{-}actual}$ that the building reaches during implementation of the policy will be equal to or less than $P_{alpha}$. The first increment $x_1$ that defines the first reference peak value $P_{alpha}$ may be established by a number of approaches. For example, $x_1$ can be set as a fixed value, can be set as a fraction or some other function of the peak value $P_{max}$, or via another method. In the example presented herein, the first increment $x_1$ is a fixed value set at 10 kW. Thus, on a day where the baseline demand profile predicts that the building will have a peak power value $P_{max\text{-}baseline}$ of 400 kW, $P_{alpha}$ would be established as 390 kW. In one aspect, the actual performance of the policy can be fed back into the trained model to optimize the selected value for the first increment $x_1$ for subsequent implementations of the policy.

In one aspect, the policy is implemented over a peak management period PMP that can be divided into multiple sub-periods, for example, a pre-cooling period PCP, a drift period DP, and a curtailment period CP. The parameters of the precooling period PCP, the drift period DP, and the curtailment period CP—including the below-discussed temperature set point values for each period, the magnitude of $P_{alpha}$ and $P_{beta}$, and the points at which each period starts and ends—are selected such that the actual power profile 110 will not cross the first reference peak value $P_{alpha}$ during the drift period DP. In some examples, the peak management period PMP does not include a drift period and proceeds directly from the pre-cooling period PCP to the curtailment period CP.

In the pre-cooling period PCP, selected components of the HVAC systems are controlled to lower the building temperature to a reduced pre-cooling set point $T_pc$ that is below the normal operating temperature set point $T_{no}$. In the curtailment period, selected components of the HVAC systems are controlled to increase the building temperature to an increased set point $T_c$ that is above the normal operating temperature set point Tao. In one example, the normal operating set point $T_{no}$ may be about 74 degrees Fahrenheit (° F.) while the reduced pre-cooling set point $T_{pc}$ may be set to about 72° F. and the increased curtailment set point $T_c$ may be set to about 76° F. In operation, the pre-cooling period begins and ends prior to the time predicted at which the baseline demand profile 100 would reach the peak value $P_{max\text{-}baseline}$ while the curtailment period occurs during the time at which the baseline demand profile 100 would have reached the peak value $P_{max\text{-}baseline}$.

In one example, the parameters (e.g. start time, end time, duration, temperature set points, etc.) of the pre-cooling period PCP can be defined at a step 1110. In one aspect, the time $t_0$ at which the peak management period PMP, and thus the pre-cooling period PCP, begins can be established by using the following protocol. In a first step, a second reference peak value $P_{beta}$ is established at step 1208 which can be defined by the peak value $P_{max\text{-}baseline}$ minus a second increment $x_2$. The second reference peak value $P_{beta}$ may also be defined as a function of the first reference peak value $P_{alpha}$ or as a function of some other parameter. The second increment $x_2$ that defines the second reference peak value $P_{beta}$ may be established by a number of approaches. For example, $x_2$ can be set as a fixed value, can be set as a fraction or some other function of the peak value $P_{max}$, or via another method. In the example presented herein, the second increment $x_2$ is a fixed value set at 20 kW. In one aspect, the actual performance of the policy can be fed back into the trained model to optimize the selected value for the second increment $x_2$ for subsequent implementations of the policy. The time t1 can be identified as the time at which the baseline demand profile 100 first intersects the second reference peak value $P_{beta}$. The start time $t_0$ of the pre-cooling period PCP can then be established by subtracting a first time increment $t_x$ from the time $t_1$. The start time to may also be defined as a function of some other parameter. The first time increment $t_x$ may be established by a number of approaches. For example, $t_x$ can be set as a fixed value, can be set as some other function of the time $t_1$, or via another method based on other considerations, as described below. In the example presented herein, the first time increment $t_x$ is a fixed value set at 2 hours. In one aspect, the actual performance of the policy can be fed back into the trained model to optimize the selected value for the first time increment $t_x$ for subsequent implementations of the policy. Referring to Figure X, it can be seen that a precooling period portion 110a of the actual demand power profile 110 increases at a greater rate in comparison to the baseline demand profile 100 during the precooling period (PCP) as would be anticipated by the additional cooling load demanded by the lowered set points $T_{pc}$. In one example, the pre-cooling period PCP ends at time $t_1$ which is the originally predicted where baseline demand profile 100 first intersects the second reference peak value $P_{beta}$.

Figure 4:
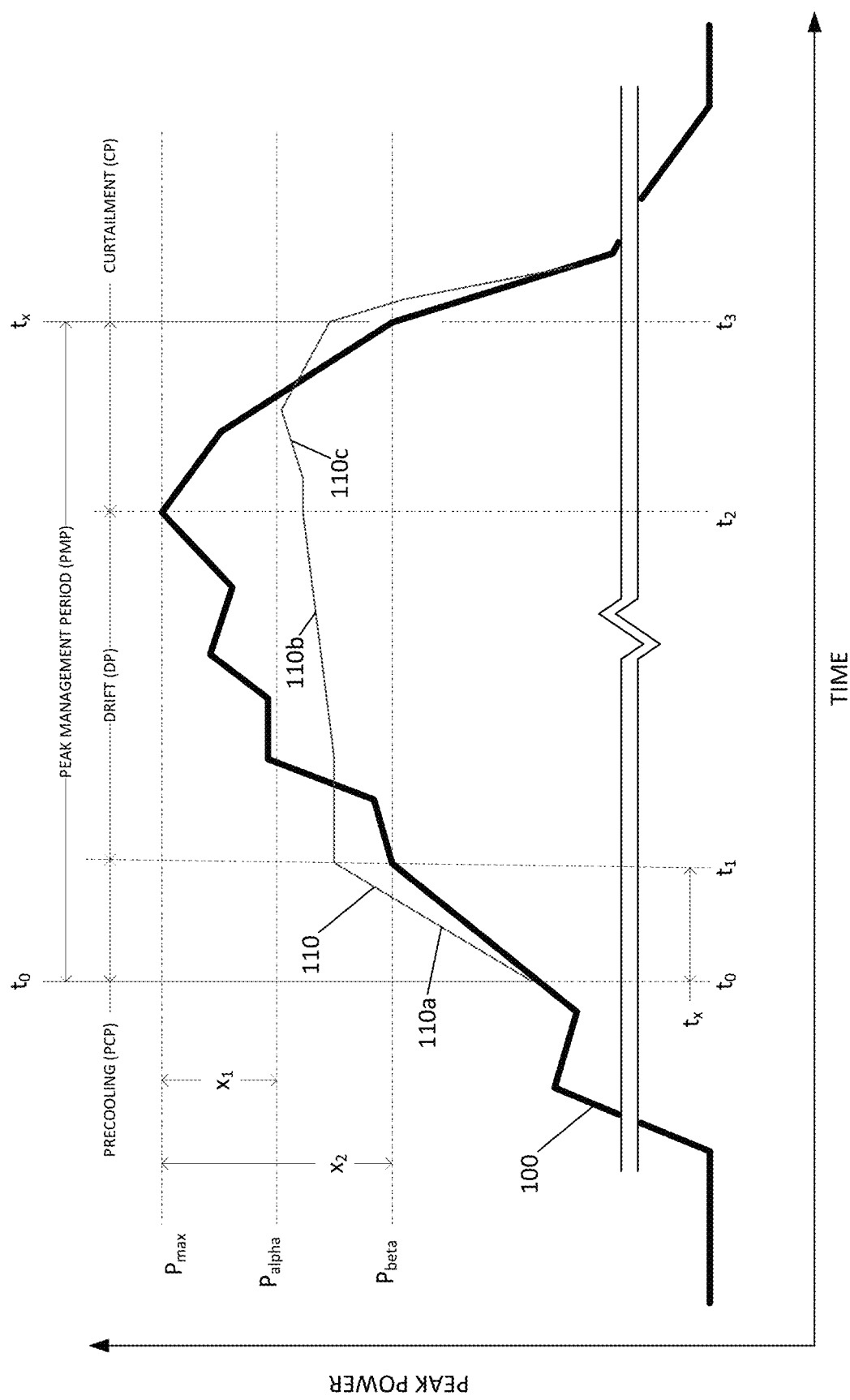
FIG. 4 illustrates a schematic diagram of the results of implementing the policy referenced at FIG. 2 in comparison to the baseline electrical demand profile referenced at FIG. 1.

In one example, the parameters (e.g. start time, end time, duration, temperature set points, etc.) of the drift period DP can be defined at a step 1112. In one example, the drift period DP commences starting at time $t_1$ whereby the HVAC system temperature set points are returned to the normal operating temperature set point $T_{no}$ until time $t_2$. As the HVAC system cooled the zones to a temperature that is well below the normal operating temperature set point $T_{no}$ during the precooling period PCP, cooling in the drift period DP is provided at a diminished rate by the selected units in the HVAC system until the zone temperatures gradually climb up to the normal operating temperature set point $T_{no}$. The selected units of the HVAC system will operate to maintain the normal operating temperature set point $T_{no}$ until the end of the drift period DP and the commencement of the curtailment period CP at time $t_2$. Referring to FIG. 4, it can be seen that a drift period portion 110b of the actual demand power profile 110 increases at a lower rate in comparison to the baseline demand profile 100 during the drift period (DP) as would be anticipated by the reduced cooling load demanded by the increased set points $T_0$. In one aspect, the drift period DP ends at time $t_2$.

In one example, the parameters (e.g. start time, end time, duration, temperature set points, etc.) of the curtailment period CP can be defined at a step 1114. In the example presented herein, the curtailment period CP starts at time $t_2$, which coincides with the time which the baseline demand profile 100 reaches the peak value $P_{max\text{-}baseline}$. At this point, the HVAC system temperature set points are updated with the curtailment period set point $T_c$, which is higher than the normal operating temperature set point $T_{no}$, until time $t_3$. As the HVAC system cooled the zones to a temperature that is well below the curtailment period set point $T_c$ during the drift period DP, cooling in the curtailment period CP is provided at a diminished rate by the selected units in the HVAC system until the zone temperatures gradually climb up to the curtailment period set point $T_c$. The selected units of the HVAC system will operate to maintain the curtailment period set point $T_c$ until the end of the curtailment period CP at time $t_3$. In one aspect, time $t_3$ is set to be the second time at which the baseline demand profile 100 intersects the second reference peak value $P_{beta}$. Once time time $t_3$ is reached, the policy ends and the HVAC system is returned to normal operation whereby the temperature set point is returned back to the normal operating temperature set point $T_{no}$. Referring to FIG. 4, it can be seen that a curtailment period portion 110c of the actual demand power profile 110 increases at a lower rate in comparison to the baseline demand profile 100 during the curtailment period (CP) as would be anticipated by the reduced cooling load demanded by the increased set points $T_c$.

Once the parameters of the periods PCP, DP, CP have been defined, the policy can be generated at a step 1116 and subsequently implemented, as described below.

The policy generation process 1100 can include additional or alternative steps for creating a policy. For example, the times at which the periods PCP, DP, and CP begin and/or end could be instead based on active variables such as thresholds associated with the actual measured space temperature or on the actual measured peak consumption of the associated air handling equipment. Switching from one period to another could also be based on an achieved condition(s), such as all zones reaching a specified temperature set point or the peak electrical demand of the entire building reaching a certain number relative to the peak electrical demand value $P_{max\text{-}baseline}$.

Figure 5:
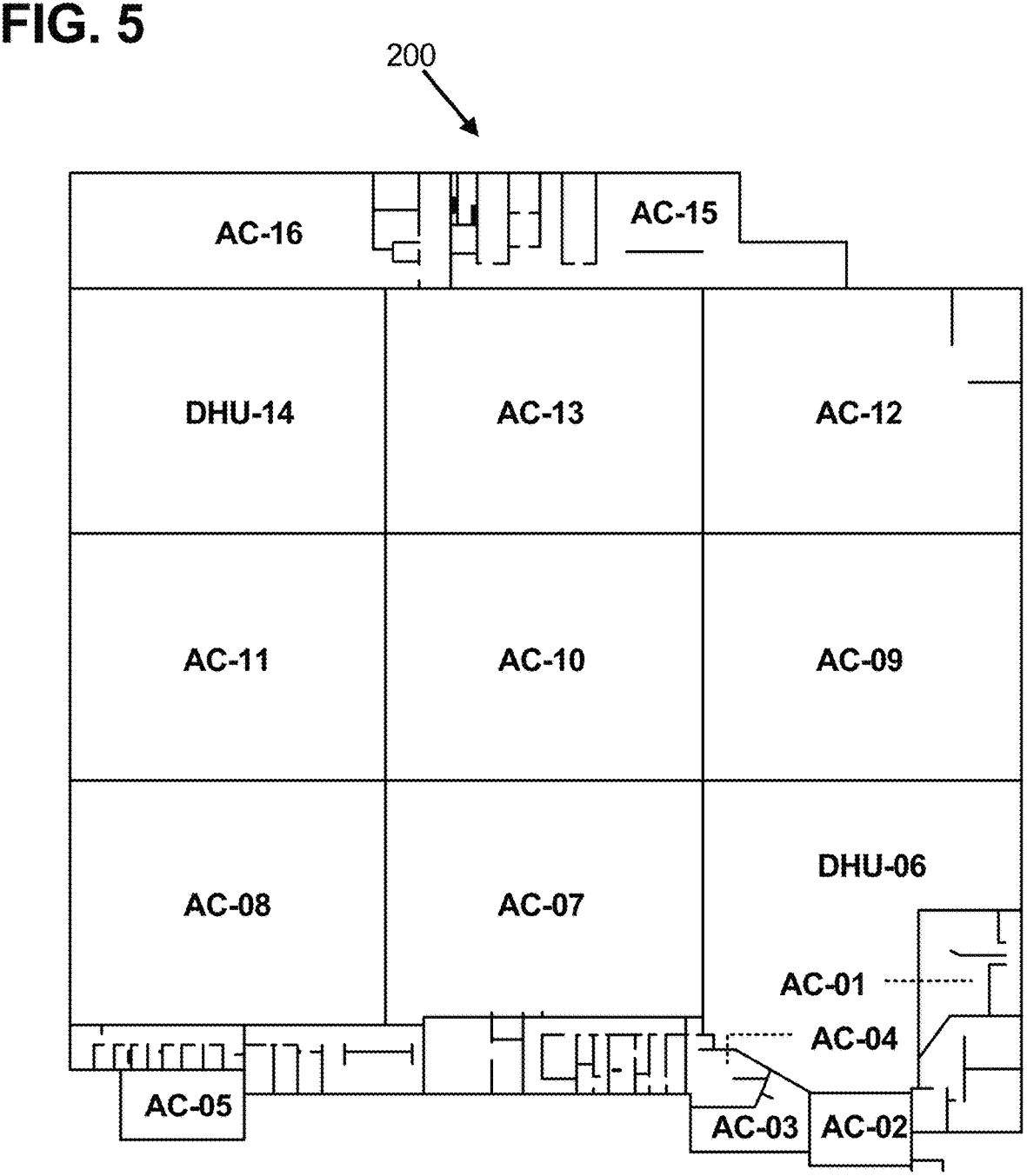
FIG. 5 is a schematic building zone layout for which the policy referenced in FIG. 2 may be implemented.

Referring to FIG. 5, a building floor layout for a retail store 200 is shown that is divided into multiple temperature control zones (AC-02, AC-03, AC-05, DHU-06, AC-7 to AC-13, DHU-14, AC-15, and AC-16) associated with an air conditioning system. In some examples, one or more air handling units (e.g. a roof-top unit RTU) serve each zone to maintain a desired temperature set point in that zone. In such cases, a temperature sensor is provided for each zone and the RTU controller and/or the building automation system is programmed with a temperature set point. The RTU controller then cycles the fan, compressors, and/or burners as needed to maintain the zone temperature at the temperature set point. The aforementioned policy temporarily replaces these normal operating temperature set points as a means for indirectly controlling the cycling of the compressors of the RTU's.

As depicted, zones AC-07, AC-10, and AC-13 are interior zones with no exterior walls (not counting the roof) while the remaining zones include at least one exterior wall. As such, the cooling load profile for the interior zones is likely to be different from the cooling load profile for the exterior zones as the exterior zones have more exposure to external temperature and solar loads in comparison to the interior zones. As such, in some examples, it may be desirable to generate multiple policies customized for each individual zone or RTU or for groups of zones and RTU's with similar loading profiles. In such an implementation, a selected number of RTU's could be operated under a first policy (e.g. RTU's associated with AC-07, AC-10, AC013) while the others could be operated under a second policy. The first and second (or more) policies can include different parameters for temperature set points, start and end times, and/or different peak reference values. It is also possible to only implement policies with respect to some RTU's and not others, thus allowing a portion of the system to remain in normal operation while another portion is operating under the rules of the policy. The policy could also include instructions for rotating the RTU's that are under control of the policy at any given time.

In one example approach, the baseline electrical demand profile 100 generated by the model can be disaggregated into multiple profiles 100 relating to the building zones or groups of zone in order to generate multiple policies. For example, the baseline electrical demand profile 100 can be divided into a first group including the most used sales floor RTU's and a second group including the least used sales floor RTUs. A policy can then be generated which implements the pre-cooling phase PCP with the group including the least used RTU's and can then subsequently implement the curtailment phase CP with the group including the most used RTU's. In one aspect, this approach can be optimized by characterizing the area defined between the baseline peak demand profile 100 and the $P_{alpha}$ line as the energy shifting potential for the target day. From that, the rate of change of energy consumption can be calculated using the gradient of the baseline demand profile 100 from time $t_1$ and a given increment before time $t_1$ (e.g. 4 hours before time $t_1$). This energy shifting potential can then be divided by the cooling or compressor capacity of the first group of RTU's to determine the number of hours for precooling required for the store, thereby providing an alternative approach for defining time to.

Although the term "RTU" is used herein, it should be understood that this is only one example of many types of air conditioning systems that could be used in conjunction with the disclosure. For example, non-limiting examples of systems for which the policy can be implemented are interior or exterior air handling units served by a central chiller plant, split-system units, and heat pump systems. Many other implementations are possible without departing from the concepts presented herein.

Policy Implementation 1200

In generalized terms, and with reference to FIG. 3, the generated peak electrical demand value $P_{max\text{-}baseline}$ for the target day can be used to predict if the occurrence of a new peak electrical demand day may occur in a process 1200. The model can make this determination by retrieving the baseline electrical demand profile 100 for the target day at step 1500, identifying the peak electrical demand value $P_{max\text{-}baseline}$ for the target day at step 1204, identifying the maximum electrical demand-to-date value within the current billing period at step 1206, and by comparing the peak electrical demand value $P_{max\text{-}baseline}$ to the maximum demand-to-date value at step 1208. Where the peak electrical demand value $P_{max\text{-}baseline}$ is predicted to be greater than the actual measured peak electrical demand for all past dates in the demand billing period, the policy can be implemented starting at time to at step 1210 to curtail electrical demand for the target day or specified time period. Where the peak electrical demand value $P_{max\text{-}baseline}$ is predicted to be less than the actual measured peak electrical demand for any past date in the demand billing period, the policy need not be implemented at step 1212 on the target day or specified time period as no demand billing savings would be expected to occur. The policy can be terminated at time $t_3$ at step 1216 whereby the system can be returned to normal operation. In one aspect, the control system can collect data at step 1218 regarding the actual demand profile 110 (e.g. the peak demand savings that occurred) and integrates this data into the model to improve the model and the subsequently generated policy for subsequent implementations. With such an approach, the model and policy can be improved in an iterative process without requiring more complex algorithms involved with real time control. However, the control system can be configured to collect data regarding the actual demand profile 110 during the implementation of the policy and to then modify the policy currently in effect to improve the performance of the policy in real time at step 1218.

Computing System

Figure 6:
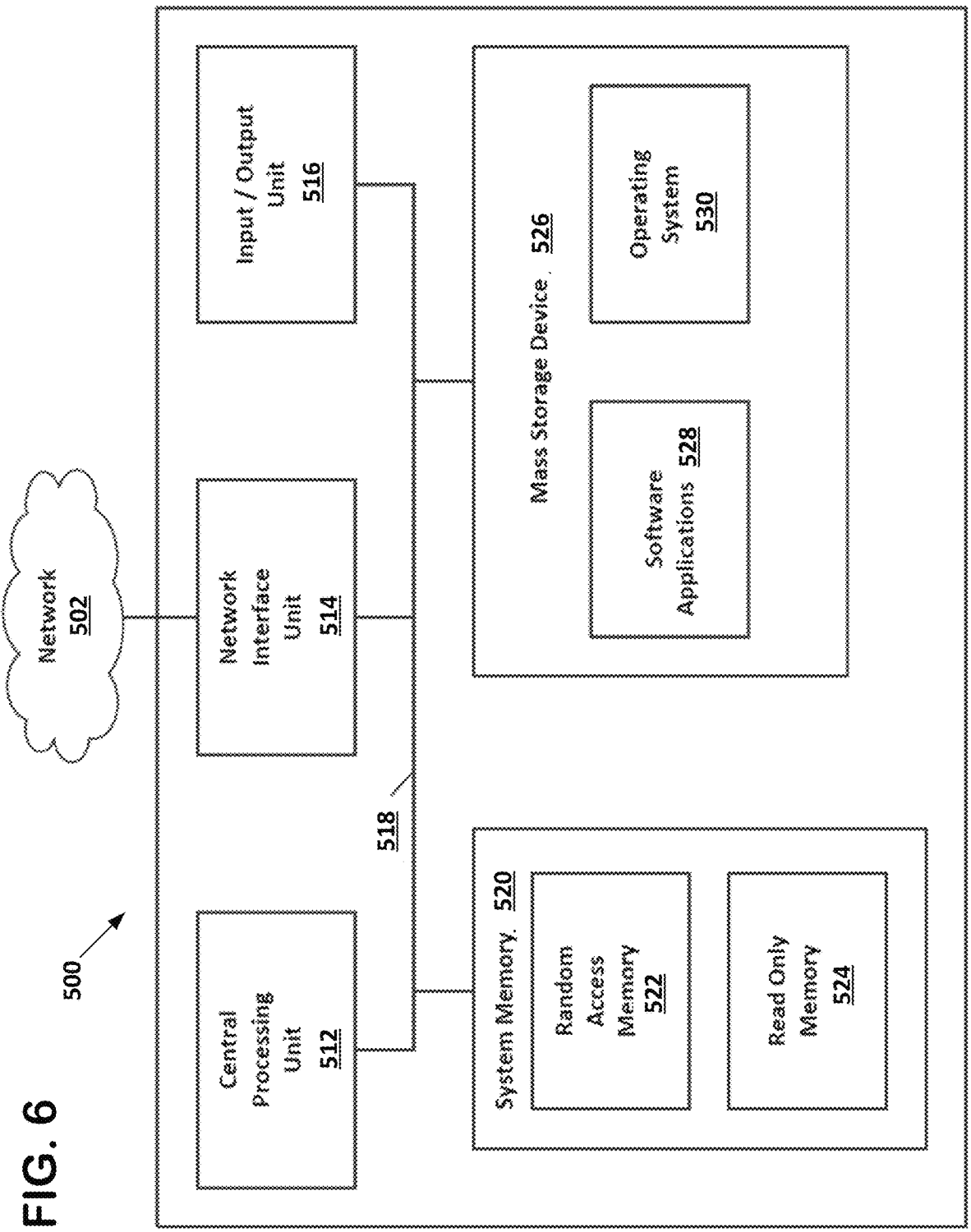
FIG. 6 illustrates a computing system usable to implement the processes shown at FIGS. 1-4.

Referring now to FIG. 6, an example block diagram of a computing system 500 is shown that is useable to implement aspects of the model and policy of FIGS. 1-4. In the embodiment shown, the computing system 500 includes at least one central processing unit ("CPU") 512, a system memory 520, and a system bus 518 that couples the system memory 520 to the CPU 512. The system memory 520 includes a random access memory ("RAM") 522 and a read-only memory ("ROM") 524. A basic input/output system that contains the basic routines that help to transfer information between elements within the computing system 500, such as during startup, is stored in the ROM 1024. The computing system 500 further includes a mass storage device 526. The mass storage device 526 is able to store software instructions and data.

The mass storage device 526 is connected to the CPU 512 through a mass storage controller (not shown) connected to the system bus 518. The mass storage device 526 and its associated computer-readable storage media provide non-volatile, non-transitory data storage for the computing system 500. Although the description of computer-readable storage media contained herein refers to a mass storage device, such as a hard disk or solid state disk, it should be appreciated by those skilled in the art that computer-readable data storage media can include any available tangible, physical device or article of manufacture from which the CPU 512 can read data and/or instructions. In certain embodiments, the computer-readable storage media comprises entirely non-transitory media.

Computer-readable storage media include volatile and non-volatile, removable and non-removable media implemented in any method or technology for storage of information such as computer-readable software instructions, data structures, program modules or other data. Example types of computer-readable data storage media include, but are not limited to, RAM, ROM, EPROM, EEPROM, flash memory or other solid state memory technology, CD-ROMs, digital versatile discs ("DVDs"), other optical storage media, magnetic cassettes, magnetic tape, magnetic disk storage or other magnetic storage devices, or any other medium which can be used to store the desired information and which can be accessed by the computing system 500.

According to various embodiments of the invention, the computing system 500 may operate in a networked environment using logical connections to remote network devices through a network 502, such as a wireless network, the Internet, or another type of network. The computing system 500 may connect to the network 502 through a network interface unit 514 connected to the system bus 518. It should be appreciated that the network interface unit 514 may also be utilized to connect to other types of networks and remote computing systems. The computing system 500 also includes an input/output unit 516 for receiving and processing input from a number of other devices, including a touch user interface display screen, or another type of input device. Similarly, the input/output unit 516 may provide output to a touch user interface display screen or other type of output device.

As mentioned briefly above, the mass storage device 526 and the RAM 522 of the computing system 500 can store software instructions and data. The software instructions include an operating system 530 suitable for controlling the operation of the computing system 500. The mass storage device 526 and/or the RAM 522 also store software instructions, that when executed by the CPU 512, cause the computing system 500 to provide the functionality discussed in this document. For example, the mass storage device 526 and/or the RAM 522 can store software instructions that, when executed by the CPU 512, cause the computing system 500 to generate the model, train the model, develop the policy, determine whether to implement the policy, and to implement the policy.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more embodiments provided in this application are not intended to limit or restrict the scope of the invention as claimed in any way. The embodiments, examples, and details provided in this application are considered sufficient to convey possession and enable others to make and use the best mode of claimed invention. The claimed invention should not be construed as being limited to any embodiment, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate embodiments falling within the spirit of the broader aspects of the general inventive concept embodied in this application that do not depart from the broader scope of the claimed invention.

What is claimed is:

1. A method for reducing peak electrical demand of a building, the method comprising:
    a) generating a baseline electrical demand profile over a target time period from a model;
    b) identifying a maximum peak demand value from the baseline electrical demand profile;
    c) calculating a first and a second reference peak value from the maximum peak demand value;
    d) defining a policy including a peak management period based on the first and second reference peak values, the peak management period including at least a first sub-period and a subsequent second sub-period, the first sub-period having a first temperature set point for at least one air handling system of the building that is different from a normal operating temperature set point, the second sub-period having a second temperature set point different from both the normal operating temperature set point and the first temperature set point; and
    e) implementing the policy.

2. The method of claim 1, wherein the first sub-period is a pre-cooling period and the first temperature set point is below the normal operating temperature set point.

3. The method of claim 2, wherein the second sub-period is a curtailment period and the second temperature set point is above the normal operating temperature set point.

4. The method of claim 1, wherein the peak management period includes a third sub-period sequentially between the first and second sub-periods.

5. The method of claim 4, wherein the third sub-period is a drift period having a third set point equaling the normal operating temperature set point.

6. The method of claim 1, wherein the target time period is a 24 hour period.

7. The method of claim 1, further including verifying that the maximum peak demand value is greater than a peak demand-to-date value within a demand billing cycle.

8. The method of claim 1, further including collecting performance data relating to implementing the policy.

9. The method of claim 8, wherein the first reference peak value is between about 75 percent and about 95 percent of the maximum peak demand value.

10. The method of claim 9, wherein the first reference peak value is about 90 percent of the maximum peak demand value.

11. The method of claim 2, wherein one or both of a starting time and an ending time of the pre-cooling period is a function of a first intersection between the baseline electrical demand profile and the second reference peak value.

12. The method of claim 11, wherein the pre-cooling period ends at the first intersection between the baseline electrical demand profile and the second reference peak value.

13. The method of claim 3, wherein the starting time of the curtailment period coincides with a time at which the maximum peak demand value occurs.

14. The method of claim 3, wherein the ending time of the curtailment period is a function of a second intersection between the baseline electrical demand profile and the second reference peak value.

15. The method of claim 14, wherein the curtailment period ends at the second intersection between the baseline electrical demand profile and the second reference peak value.

* * * * *